Figure 1:
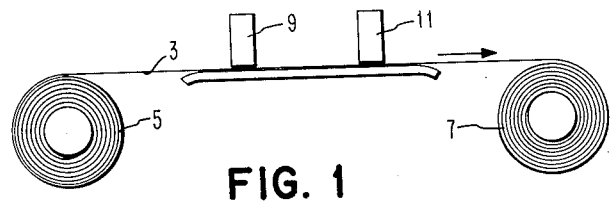

May 5, 1964     A. CUTAIA     3,132,242

RECORD SENSING APPARATUS

Filed Dec. 23, 1960

INVENTOR

ALFRED CUTAIA

BY *Paul M. Brennan*

AGENT

United States Patent Office 3,132,242
Patented May 5, 1964

3,132,242
RECORD SENSING APPARATUS
Alfred Cutaia, Johnson City, N.Y., assignor to International Business Machines Corporation, New York, N.Y., a corporation of New York
Filed Dec. 23, 1960, Ser. No. 78,011
4 Claims. (Cl. 235—61.11)

This invention relates to record sensing and particularly to an improved form of record sensing apparatus for sensing information recorded as marks, symbols or characters, punched holes and the like, on record media such as paper tape or cards.

A variety of arrangements are known in the art for sensing punched holes in record cards or tapes without the necessity of sensing brushes passing through the holes in the record. Examples are sensing by light passed through the holes to photoelectric devices, and measurement of the difference of dielectric constant for the record material and the air in a punched hole. For sensing marks or characters, reflected or transmitted light may be used. Also, the marks or symbols may be characterized by special qualities which can be detected, such as magnetic properties, conductivity and so forth. These known systems all require either special qualities of the marks or symbols, or require the supply of energy from a special source, such as suitable light sources, high frequency electrical sources, and so forth, to the detection apparatus itself.

It is a primary object of this invention to provide an improved record sensing apparatus which is passive in nature, relying on energy differences naturally existing between the marks or characters and the record medium.

Another object of this invention is to provide an improved form of record sensing apparatus which has good signal to noise ratio, and high signal sensitivity.

A further object of the invention is to provide an improved form of record sensing apparatus employing a transducer of simple geometry and low cost.

Still another object of the invention is to provide an improved form of record sensing apparatus which provides low transducer-to-record pressure, or in some cases, eliminates all contact between the transducer and the record.

To attain this and other objects, the invention, briefly described, utilizes the electrostatic charges normally present on the record medium. If desired, the effect may be enhanced by supplying additional amounts of electrostatic charge to the record medium prior to sensing. The amount of charge per unit area will differ in accordance with the presence or absence of a mark or character on the medium, or a punched hole in the medium.

At the sensing station the medium is moved relative to one or more transducers which are essentially miniature electrostatic probes, comprising a hollow metallic shielding conductor, with one or more probe conductors mounted within the shield conductor and insulated therefrom. Voltage responsive apparatus connected between the probe conductor and the shield conductor provides an indication of any change in electrostatic energy in the area at the end of the probe.

The foregoing and other objects, features and advantages of the invention will be apparent from the following more particular description of preferred embodiments of the invention, as illustrated in the accompanying drawings.

Figure 2:
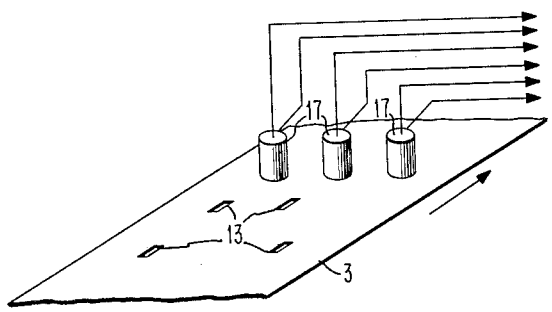
Figure 3:
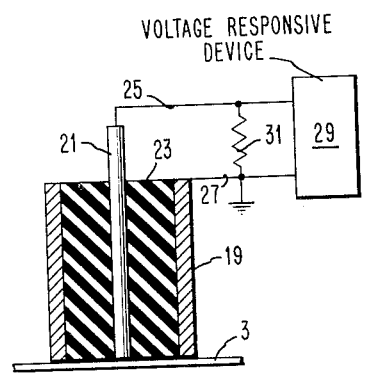
Figure 4:
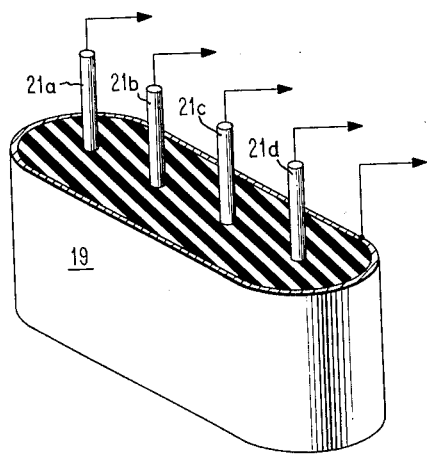

In the drawings:

FIG. 1 is a diagrammatic view of a record sensing apparatus for sensing marks or perforations on paper tape, in which the present invention may be employed, FIG. 2 is a diagrammatic view of one embodiment of the invention employing a plurality of physically separate transducers, FIG. 3 is a diagrammatic view of a cross-section of a typical transducer, and also illustrates one method of connecting the transducers to a voltage responsive device, and FIG. 4 is a diagrammatic view of a second embodiment of the invention comprising a transducer structure having a plurality of probes.

Similar reference characters refer to similar parts in each of the several views.

In FIG. 1, there is shown diagrammatically an arrangement for sensing marks or punched holes on paper tape. The tape 3 is transferred between a supply reel 5 and a take up reel 7, the reels driven by means not shown. The marked or punched tape, moving in the direction indicated by the arrow, passes an optional charging or energizing station indicated symbolically at 9, and thereafter passes a sensing station indicated symbolically at 11.

One arrangement of electrostatic transducers in accordance with the invention is shown in FIG. 2. The tape 3, or other record medium, bearing either holes or conductive marks 5 thereon arranged in accordance with any suitable code, moves past one or more transducers 7 aligned transversely to the direction of tape motion, one such transducer being provided for each position across the tape where code marks or punched holes may be found. In the example shown, it is apparent that three channels exist across the tape, and accordingly three transducers are arranged across the travel path of the tape as shown.

As shown by the cross-sectional view in FIG. 3, each transducer comprises an outer or shield electrode 19 which, as shown in the drawings, may constitute a portion of metal tubing, such as a short length of brass tubing, and a central probe conductor 21, which may constitute a short length of ordinary wire, centrally disposed within the shield electrode and co-extensive therewith. The central conductor is insulated from the shield electrode, for example, by filling the intervening space with a suitable insulating compound 23. The lower surface of the probe is finished to a plane surface, perpendicular to the long axis of the probe. Electrical connections are established to the upper end of the central conductor and to the shield electrode, as indicated in the drawings. A suitable voltage responsive device 29, such as an electronic amplifier, has its input connected across the probe, as indicated. A loading resistor 31 is connected across the electrical connections across which a voltage is developed as the transducer detects difference in charge as the record medium, in this case the tape 3, and the marks or punched holes are moved relative to the transducer.

A modification of the transducer is shown in FIG. 4, in which a plurality of probes or central conductors 11a, 11b, 11c and 11d are enclosed by a single shield electrode, which is connected to a common return for each voltage responsive device connected to the individual probe wires.

The phenomena involved is believed to be the result of static charge buildup on the transducer, the amount of charge being some function of the relative capacitivity between the transducer and the record medium. When the transducer moves, relative to the record medium, differences in potential occur as the transducer surface moves from the paper surface to the ink or graphite surface of a mark, for example. These differences of potential are utilized by the voltage responsive device to provide output signals indicative of the recorded information.

While the invention has been particularly shown and described with reference to two preferred embodiments thereof, it will be understood by those skilled in the art that various changes in form and details may be made therein without departing from the spirit and scope of the invention.

What is claimed is:

1. Electrostatic record sensing apparatus for sensing information recorded on a record medium, in which the areas of recorded information and areas having no recorded information have different values of capacitivity and are electrostatically charged at different values, comprising, in combination, a sensing station including at least one electrostatic probe arranged to move relative to said record medium in a path including the areas of recorded information, said electrostatic probe comprising a central probe conductor and a conductive outer shield coaxial with the central probe conductor and insulated therefrom, electrical connections to said central probe conductor and said shield, and voltage responsive means connected to said electrostatic probe by said electrical connections for detecting changes in potential caused by differences in charge detected by said probe.

2. Electrostatic record sensing apparatus as claimed in claim 1, in which said electrostatic probe comprises a plurality of probe conductors encompassed by a shield electrode and insulated therefrom.

3. Electrostatic record sensing apparatus for sensing information recorded as ink or graphite marks on a paper record medium, said ink or graphite marks having a different value of capacitivity than said paper record medium, said marks, where present, being located in one or more of a plurality of channels along said record medium, said apparatus comprising, in combination, an electrostatic probe for each of said channels for detecting differences in the electrostatic charge of the record medium in accordance with the presence or absence of a record mark, each probe comprising a coaxial central conductor extending through and insulated from an outer shield conductor, electrical connections to said central probe conductor and said shield, and voltage responsive means connected to each of said probes by said electrical connections for indicating the change in voltage caused by differences in charge in the area sensed by the associated probe.

4. Electrostatic record sensing apparatus as claimed in claim 3 in which a plurality of probe electrodes, one for each information channel are enclosed in a common shield conductor and insulated therefrom.

References Cited in the file of this patent

UNITED STATES PATENTS 2,949,226    Lubkin _____ Aug. 16, 1960

FOREIGN PATENTS 72,482    France _____ Nov. 9, 1959